UNITED STATES PATENT OFFICE 2,073,099

N-(AMINOALKYL)-ANTHRANILIC ACID ALKYL ESTERS AND A PROCESS OF PREPARING THEM

Otto Eisleb, Hofheim in Taunus, Germany, assignor to Winthrop Chemical Company, Inc., New York, N. Y., a corporation of New York No Drawing. Application July 20, 1935, Serial No. 32,468. In Germany July 26, 1934

4 Claims. (Cl. 260—43)

The present invention relates to N-(aminoalkyl)-anthranilic acid alkyl esters and to a process of preparing them.

I have found that N-(aminoalkyl)-anthranilic acid alkyl esters may be produced by introducing an amino alkyl radical into the amino group of anthranilic acid esters. This introduction may be carried out either by causing amino alkyl halides to act upon anthranilic acid alkyl esters or by esterifying according to the usual methods with alcohols the N-(aminoalkyl)-anthranilic acids obtainable by the action of aminoalkyl halides upon solutions of the salts of anthranilic acids.

The compounds being thus obtained have the following general formula:

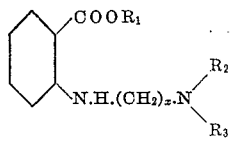

wherein $R_1$ stands for alkyl, $R_2$ and $R_3$ stand for alkyl or hydrogen or $R_2$ and $R_3$ together stand for the grouping

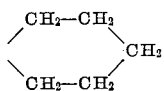

and $x$ stands for 2 or a whole number greater than 2.

The compounds constitute colorless to weakly yellowish water-insoluble oils of a bluish fluorescence which, in the form of their salts, are water-soluble. The compounds and the salts thereof are excellent local anaesthetics. This anaesthesizing property is considerably stronger than that of already known analogous compounds of the para-series.

The following examples serve to illustrate the invention, but they are not intended to limit it thereto, the parts being by weight unless otherwise stated:

*(1) N-beta-diethylaminoethyl-anthranilic acid ethyl ester*

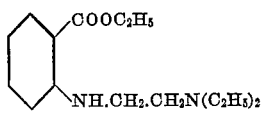

To a mixture of 10 parts of anthranilic acid ethyl ester and 10 parts of chloroform there are added drop by drop at 60° C. 8 parts of beta-diethylaminoethyl chloride; the mixture is then kept for 5 hours at 60° C. After cooling the whole is shaken with an excess of dilute sodium carbonate solution; the separated chloroform solution is fractionated, after drying, over potassium carbonate and yields, besides unchanged anthranilic acid ethyl ester, the N-beta-diethylaminoethyl-anthranilic acid ethyl ester boiling under 5 mm. pressure and at about 175° C. in the form of a feebly yellowish oil of a bluish fluorescence. The mono-hydrochloride forms colorless water-soluble crystals; F=121° C.

*(2) N-beta-diethylaminoethyl-anthranilic acid butyl ester*

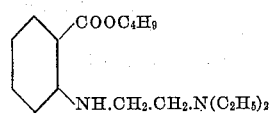

14 parts of anthranilic acid are dissolved in 50 parts by volume of 2/1 n-caustic soda solution and the solution is shaken with 14 parts of beta-diethylaminoethyl chloride; this operation is exothermic and the temperature rises to 40° C. When all the chloride is dissolved the liquid is evaporated to dryness on the water-bath, and the triturated solid substance is extracted by boiling with 300 parts of absolute alcohol. From the solution filtered from the undissolved sodium chloride there separates the N-beta-diethylaminoethyl-anthranilic acid in the form of a colorless crystalline powder which, after standing for some time in the cold, is filtered with suction, washed with alcohol and dried. F=159° C. to 161° C. The acid is very readily soluble in water.

The esterification with butyl alcohol is carried out either by boiling the acid with an excess of butyl alcohol saturated with hydrogen chloride or by the reaction between butyl alcohol and the hydrochloride of the acid chloride made from the acid, in benzene solution by action of phosphorous pentachloride. The basic ester itself is oily, the monohydrochloride forms colorless water-soluble crystals; F=113° C. to 116° C.

*(3) N-beta-aminoethyl-anthranilic acid ethyl ester*

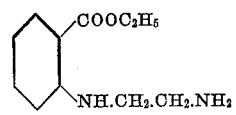

33 parts of anthranilic acid ethyl ester and 12 parts of the hydrochloride of beta-aminoethyl chloride are heated together for 5 hours, while agitating, at a temperature between 130° C. and 140° C. After cooling the viscid mass obtained is mixed with water and ether and caustic soda solution is added until there is an alkaline reaction to phenolphthalein. The ethereal solution which settles after shaking is separated and fractionated under reduced pressure, it yields, besides unchanged anthranilic acid ester, the N-beta-aminoethylanthranilic acid ethyl ester in the form of a feebly yellowish oil of a bluish fluorescence which distils at about 162° C. under a pressure of 6 mm. The monohydrochloride forms, when recrystallized from acetone, colorless needles (F=192° C. to 193° C.) which are readily soluble in water.

(4) *N-beta-(butylamino)-ethyl anthranilic acid ethyl ester*

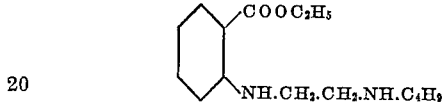

If, instead of 12 parts of the hydrochloride of beta-aminoethyl chloride as indicated in Example 3, there are used 17.5 parts of the hydrochloride of beta-butylamino-ethyl chloride (obtainable from beta-butylaminoethanol and hydrochloric acid gas at a temperature of 200° C. with distillation of the water produced) the operation being otherwise conducted as indicated in Example 3, the N-beta-(butylamino)-ethyl anthranilic acid ethylester is obtained in the form of a feebly yellowish oil boiling at a temperature of 195° C. to 200° C. under a pressure of 6 mm. The monohydrochloride, when recrystallized from acetone, forms colorless water-soluble needles. F. 147° C. The product is readily soluble in water.

(5) *N-beta-piperidinoethyl anthranilic acid ethyl ester*

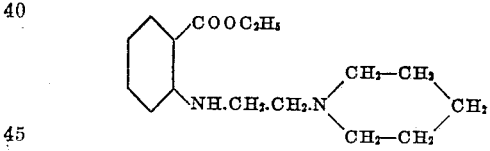

33 parts of anthranilic acid ethyl ester and 29.5 parts of beta-piperidinoethyl chloride are mixed, and the mixture is slowly heated to 70° C. and kept at this temperature for 2 hours. The solid mass obtained is dissolved in water. After addition of ether the base is set free by means of caustic soda solution. The separated ethereal solution yields, on fractionation, besides unchanged anthranilic acid ester, the N-beta-piperidinoethyl anthranilic acid ethyl ester distilling at 200° C. under a pressure of 6 mm. in the form of a yellowish oil of a bluish fluorescence. The monohydrochloride is a colorless crystalline powder readily soluble in water and melting at 184° C.

I claim:

1. As a new product the compound of the following formula:

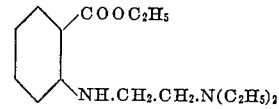

being a colorless to weakly yellowish, bluish-fluorescent water-insoluble oil which in the form of its salts is water-soluble.

2. As a new product the compound of the following formula:

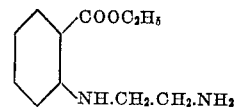

being a colorless to weakly yellowish, bluish-fluorescent water-insoluble oil which in the form of its salts is water-soluble.

3. As a new product the compound of the following formula:

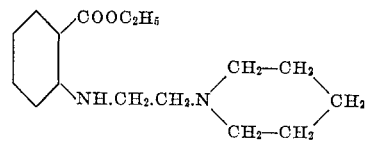

being a colorless to weakly yellowish, bluish-fluorescent water-insoluble oil which is the form of its salts is water-soluble.

4. As new products the compounds of the following formula:

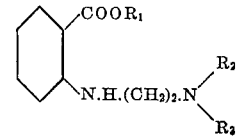

wherein $R_1$ stands for alkyl and $R_2$ and $R_3$ for a member of the group consisting of hydrogen, alkyl and the cyclic grouping

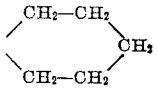

being colorless to weakly yellowish, bluish-fluorescent water-insoluble oils which in the form of their salts are water-soluble.

OTTO EISLEB.